(12) United States Patent
Tsai et al.

(10) Patent No.: US 8,571,403 B2
(45) Date of Patent: Oct. 29, 2013

(54) AUTOFOCUS SYSTEM

(75) Inventors: Tung-Chan Tsai, Taipei (TW); Homer H. Chen, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/491,409

(22) Filed: Jun. 7, 2012

(65) Prior Publication Data

US 2012/0243858 A1    Sep. 27, 2012

Related U.S. Application Data

(63) Continuation-in-part of application No. 12/780,490, filed on May 14, 2010, now Pat. No. 8,254,774.

(30) Foreign Application Priority Data

May 16, 2012    (TW) .............................. 101117486 A

(51) Int. Cl.
G03B 3/00        (2006.01)
G03B 13/00       (2006.01)

(52) U.S. Cl.
USPC .............. 396/104; 396/93; 396/125; 348/349

(58) Field of Classification Search
USPC ..................... 396/89, 93, 104, 121, 122, 125; 348/349, 351, 345

See application file for complete search history.

(56) References Cited

U.S. PATENT DOCUMENTS

| 7,502,523 B2 * | 3/2009 | Kim | 382/255 |
| 2006/0126954 A1 * | 6/2006 | Kim | 382/239 |
| 2006/0146174 A1 * | 7/2006 | Hagino | 348/349 |
| 2007/0053675 A1 * | 3/2007 | Pollard | 396/121 |
| 2008/0231730 A1 * | 9/2008 | Tsuruoka | 348/229.1 |

* cited by examiner

*Primary Examiner* — Clayton E LaBalle
*Assistant Examiner* — Warren K Fenwick
(74) *Attorney, Agent, or Firm* — Stout, Uxa, Buyan & Mullins, LLP

(57) ABSTRACT

In an autofocus system, a focus measurement unit receives an image, and accordingly generates an associated focus value. A focus transform unit receives and then transforms the focus value provided by the focus measurement unit, therefore generating an associated transformed focus value. An in-focus position estimation unit obtains an in-focus position, in an analytical manner, according to some transformed focus values and some associated lens positions.

18 Claims, 8 Drawing Sheets

AUTOFOCUS SYSTEM

CROSS-REFERENCE TO RELATED APPLICATIONS

The present invention claims the benefit of foreign priority under 35 U.S.C. §119(a) of Taiwan Patent Application No. 101117486, filed on May 16, 2012, and is a continuation-in-part of U.S. patent application Ser. No. 12/780,490, filed on May 14, 2010, entitled "AUTOFOCUS METHOD," which claims the priority benefit of Taiwan Patent Application No. 98122866, filed on Jul. 7, 2009, the entire contents all of which are incorporated herein by reference.

BACKGROUND OF THE INVENTION

1. Field of the Invention

The present invention relates generally to autofocus camera, and more particularly, to an autofocus method that processes data of lens positions and focus values so as to obtain a lens position at which a sharp image can be captured. The present invention further relates to an autofocus system that is capable of fast estimating an in-focus position.

2. Description of Related Art

In the autofocus process of a camera, the lens of the camera is moved from one position to another. At each lens position, the corresponding focus value is calculated. After each movement of the lens, a decision is made as to whether the maximum focus value is obtained.

FIG. 1A is a diagram illustrating the relationship between focus values and lens positions. The peak point H shown in FIG. 1A corresponds to the maximum focus value. FIG. 1B shows a conventional autofocus process. The autofocus process continues until the maximum focus value is found, at which a focused image can be captured. That is, if the ideal lens position is found, the autofocus process terminates; otherwise, the direction and distance of the subsequent movement of the lens are determined, and the steps of moving the lens and calculating the focus value are repeated.

Various algorithms, such as global search, binary search, and rules-based search algorithms, can be applied to search for the lens position that gives rise to maximum focus value.

The global search algorithm records the focus value at each lens movement and goes through all lens positions to exhaustively determine which lens position gives rise to the maximum focus value. Therefore, a reasonably complete plot close to that shown in FIG. 1A is obtained, and the peak point H can be accurately identified. However, the global search algorithm is time consuming.

To overcome the above-described drawback, a two-stage search algorithm has been developed, wherein the search process comprises a coarse search stage and a fine search stage. The coarse search is first performed according to the gradient of the focus values with respect to the lens position so as to estimate which range the peak point H may fall within. Subsequently, a fine search is performed by fitting a second-order quadratic or Gaussian curve to the focus values as a function of lens position within the range of the peak point described above.

Furthermore, U.S. Publication No. 2008/0180563 discloses another autofocus method, wherein a search step look-up table is established in accordance with the total number of lens movements and the corresponding focus values. During the autofocus process, the direction and the distance of lens movements are determined in accordance with the search step look-up table.

Compared with the global search algorithm, the above-described techniques can increase the speed and reduce the number of lens movements. However, all these techniques require parameter adjustment and may not be efficient enough for practical applications. In addition, these techniques may not be able to provide sufficiently accurate results.

The autofocus of a camera primarily includes two parts: focus measurement and search strategy. The focus measurement generates an associated focus value according to an input image, and a focus profile (or focus curve) may thus be obtained by collecting lens positions and their associated focus values. The search strategy obtains an in-focus position, that is, a lens position with a maximum focus value, by moving the lens according to the obtained focus profile.

Conventional search strategies generally have the following drawbacks. The focus profile usually has steep and narrow curvature around the maximum focus value for the purpose of resisting noise in an image to improve accuracy of the autofocus. The steep-and-narrow focus profile reduces the search speed, or makes it difficult for the conventional search strategies to design. Moreover, the conventional search strategies commonly use a lot of parameters to locate a current lens position along the focus profile. It is not only difficult to determine the parameters but also hard to apply the parameters to different scenes with distinct complexities. For the worse, the parameters need be determined again once the focus measurement is replaced. Furthermore, a rule-based search strategy, such as Fibonacci search strategy, cannot be well adapted to the autofocus of a digital video camera for the reason that some assumptions about an initial lens position should be made.

Accordingly, a need has thus arisen to provide a novel autofocus scheme to solve the problems related to the conventional autofocus methods.

SUMMARY OF THE INVENTION

In view of the above drawbacks, the present invention provides an autofocus method that comprises the steps of: (1) obtaining an initial dataset of focus samples containing lens positions and focus values corresponding to the lens positions; (2) fitting the focus samples in the initial dataset to estimate the ideal lens position; (3) moving the lens to the estimated lens position to obtain an estimated focus value corresponding to the estimated lens position; and (4) determining whether the estimated lens position is proximate to the prior lens position thereof, wherein, if it is, the autofocus process stops, and, if not, fitting a plurality of the focus samples obtained in the previous steps to re-estimate the subsequent lens position, and returning to step (3).

The present invention provides an autofocus method for obtaining a lens position where a clear image can be captured. If the estimated lens position is proximate to the prior lens position thereof, this indicates that a clear image can be captured at the estimated lens position. Otherwise, the present invention fits the focus samples consisting of lens positions obtained antecedently and the corresponding focus values until a newly estimated lens position is proximate to the prior newly estimated lens position thereof, thereby obtaining the lens position with the maximum focus value that gives rise to the clearest image.

As mentioned above, the present invention estimates the optimal lens position using the data of focus values and lens positions, instead of adjusting parameters, to increase the focusing speed and reduce the number of lens movements.

It is an object of one embodiment of the present invention to provide an autofocus system and method to fast estimate an in-focus position such that the amount of computations and empirical parameters may be substantially reduced.

According to one embodiment, an autofocus system includes a focus measurement unit, a focus transform unit and an in-focus position estimation unit. The focus measurement unit receives an image, and accordingly generates an associated focus value. The focus transform unit receives and then transforms the focus value provided by the focus measurement unit, therefore generating an associated transformed focus value. The in-focus position estimation unit obtains an in-focus position, in an analytical manner, according to some transformed focus values and some associated lens positions.

DETAILED DESCRIPTION OF THE INVENTION

The following illustrative embodiments are provided to illustrate the disclosure of the present invention, these and other advantages and effects being apparent to those skilled in the art after reading the disclosure of this specification. The invention may, however, be embodied in many different forms and should not be construed as limited to the embodiments set forth herein. It should be noted that various modifications and variations may be performed without departing from the scope of the present invention.

Figure 1A:
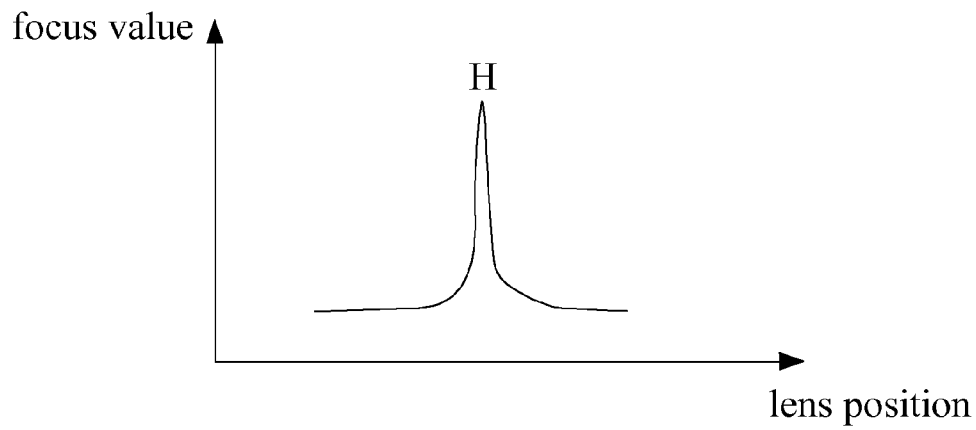
FIG. 1A is a plot illustrating the relationship between lens positions and focus values individually corresponding to the lens positions.
Figure 1B:
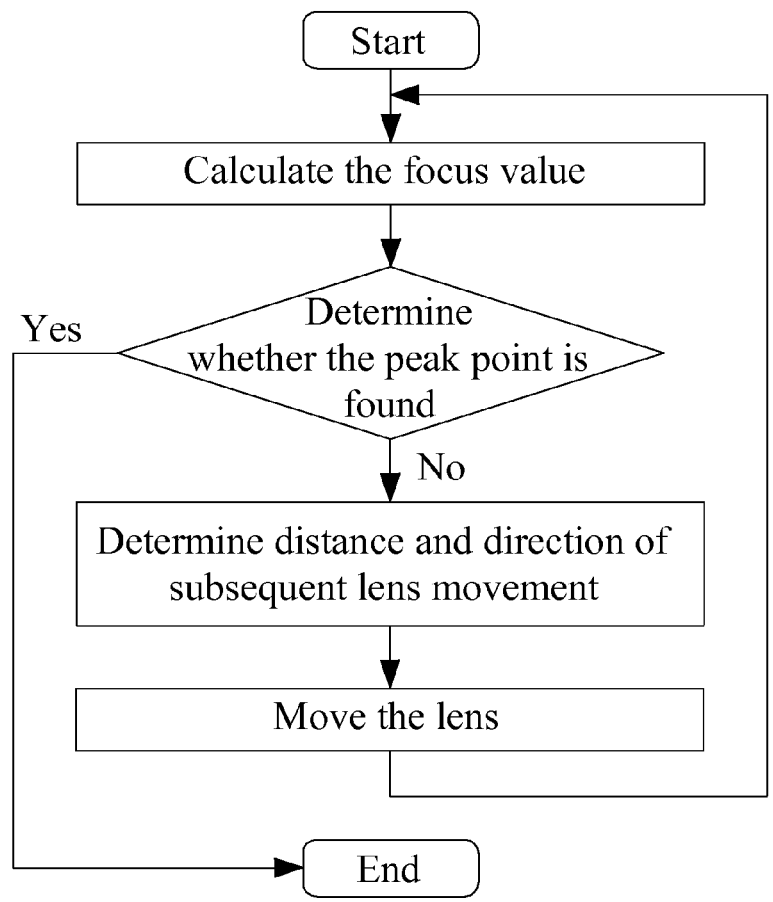
FIG. 1B is a flowchart illustrating a conventional autofocus method.
Figure 2:
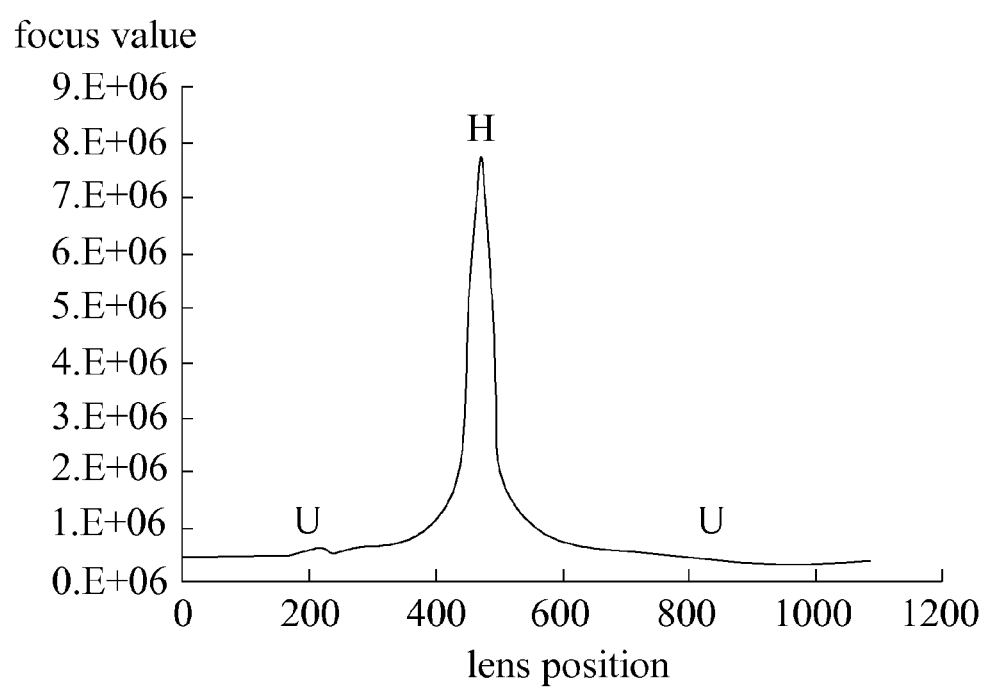
FIG. 2 is a plot illustrating the relationship between lens positions and focus values individually corresponding to the lens positions according to an autofocus method of the present invention.

FIG. 2 is a diagram illustrating the relationship between lens positions and focus values according to one embodiment of the present invention. An image can be captured at a lens position, and a focus value can be calculated according to the image, wherein the focus value represents the sharpness of the image. In the present embodiment, a bell-shaped curve can be drawn with all lens positions and focus values individually corresponding to the lens positions.

In the present embodiment, the present invention provides a full model $F=G(a,b,c,(x-m))$, wherein F represents a focus value, G represents a function, x represents a lens position, and a, b, c and m are parameters, wherein m represents the ideal lens position. The characteristics of the full model $F=G(a,b,c,(x-m))$ can be described through the parameters a, b, c and m. As shown in FIG. 2, H, denotes the peak point of the curve and U denotes the flat portion of the curve. The parameter 'a' controls the amplitude of the curve, i.e., the height of the peak point H, and the parameters 'b' and 'c' control the curvature from the peak point H to the flat portion U on both sides of the peak point H. In the present embodiment, only the parameters that are relative to the autofocus method of the present invention are provided in the model $F=G(a,b,c,(x-m))$. It should be noted that the full model involving $F=G(a,b,c,(x-m))$ can have other parameters denoting other characteristics of the curve.

Further, the full model involving $F=G(a,b,c,(x-m))$ can be simplified into a simplified model $F=G(a,b,J,(x-m))$, wherein J is a fixed value. It should be noted that the full model can also be simplified into other models. Furthermore, in order to reduce the computational complexity, the simplified model $F=G(a,b,J,(x-m))$ is non-linearly transformed so as to obtain a function $Z(F)=Ax^2+Bx+C$ for estimating the ideal lens position, wherein Z represents a non-linear transformation. It should be noted that the present invention is not limited thereto, for example, the $Z(.)$ can be reciprocal transformation, $Z(F)=1/F$, wherein F is focus value(s).

Figure 3:
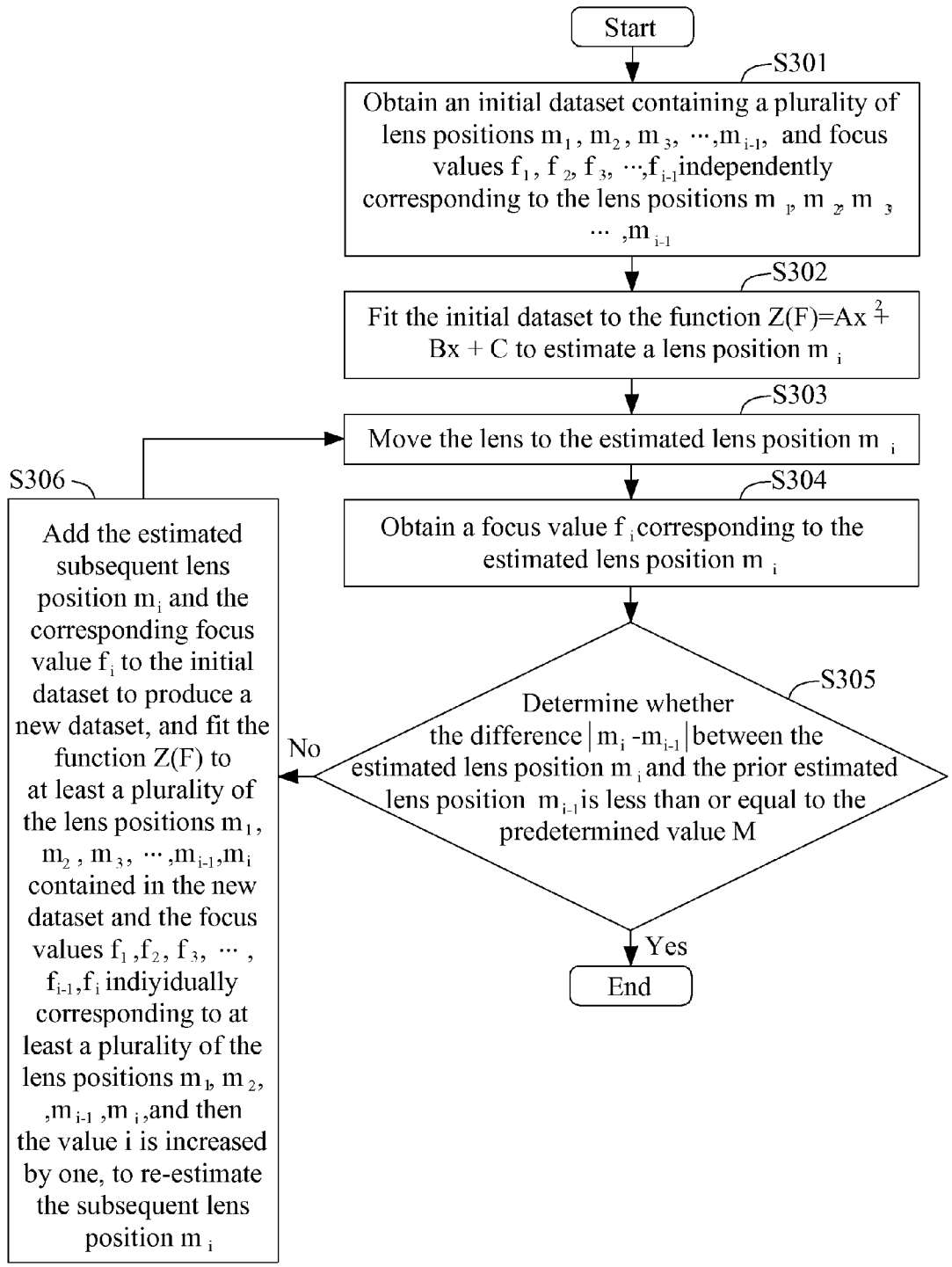
FIG. 3 is a flowchart showing an autofocus method according to an embodiment of the present invention.

FIG. 3 shows an autofocus method according to an embodiment of the present invention. In the present embodiment, the ideal lens position is estimated by fitting the function $Z(F)=Ax^2+Bx+C$ to an initial dataset of focus samples containing lens positions and focus values corresponding to the lens positions. The flowchart of FIG. 3 comprises a loop structure, wherein, if it is determined that the estimated lens position is not proximate to the prior estimated lens position, move the lens to the estimated lens position, and then add the estimated lens position $m_i$ and the corresponding focus value $f_i$ to the initial dataset to produce a new dataset, such that the function $Z(F)=Ax^2+Bx+C$ can be fitted to the focus samples in the new dataset, for estimating the subsequent lens position. Such iteration(s) will be performed until the estimated lens position is proximate to the prior estimated lens position. It should be noted that the mathematical symbols and loop structure in the drawing are not intended to limit the present invention.

As shown in FIG. 3, at step S301, an initial dataset of focus samples is obtained by moving the lens to different lens positions, wherein the initial dataset of focus samples contains a plurality of lens positions $m_1, m_2, m_3, \ldots, m_{i-1}$ and focus values $f_1, f_2, f_3, \ldots, f_{i-1}$ independently corresponding to the plurality of lens positions $m_1, m_2, m_3, \ldots, m_{i-1}$. As a specific embodiment, the lens is moved to three different lens positions $m_1, m_2,$ and $m_3$ so as to obtain the focus values $f_1, f_2,$ and $f_3$ corresponding to the lens positions, respectively. The three different lens positions $m_1, m_2,$ and $m_3$ and the corresponding focus values are denoted as the initial dataset of focus samples.

In one embodiment, the three different lens positions can be arbitrarily chosen along the axis of the lens. In another embodiment, the three different lens positions refer to an initial lens position and two lens positions that are forward and backward from the initial lens position, respectively, both being at the same distance from the initial lens position. In another embodiment, the first and second lens positions are arbitrarily chosen and the corresponding focus values are obtained, and the third lens position is determined according to the gradient of the focus values at the first and second lens positions. For example, when the lens is moved from the first lens position $m_1$ to the second lens position $m_2$, if the focus value at the second lens position $m_2$ is less than the focus value at the first lens position $m_1$, the third lens position $m_3$ is selected such that the focus value at this position is greater than the focus values at the first position $m_1$. That is, the first lens position $m_1$ is located between the second lens position $m_2$ and the third lens position $m_3$. On the other hand, if the focus value at the second lens position $m_2$ is greater than the focus value at the first lens position $m_1$, the third lens position $m_3$ is selected such that the focus value at the position is greater than the focus value at the second lens position $m_2$. That is, the second lens position $m_2$ is located between the first lens position $m_1$ and the third lens position $m_3$. Then, the process goes to step S302.

At step S302, fit the function $Z(F)=Ax^2+Bx+C$ to a plurality of focus samples in the initial dataset, to obtain parameters $A_i$, $B_i$, $C_i$, the fitting preferably being a weighted fitting wherein the weight values of the weight fitting are independently proportional to each of the focus values corresponding to a plurality of the lens positions in the initial dataset. Further, obtain an estimated lens position $m_i$ according to the estimated parameters $A_i$, $B_i$, and $C_i$. Then, the process goes to step S303.

At step S303, move the lens to the estimated lens position $m_i$, and then, at step S304, obtain the focus value $f_i$ corresponding to the estimated lens position $m_i$. Then, the process goes to step S305.

At step S305, determine whether the estimated lens position $m_i$ is proximate to the prior estimated lens position thereof $m_{i-1}$; that is, it is determined whether $|m_i-m_{i-1}|$ is less than or equal to a predetermined value M. If it is not, the process goes to step S306, and, if it is, the autofocus process is terminated.

At step S306, add the estimated lens position $m_i$ and the corresponding focus value $f_i$ into the initial dataset to produce a new dataset, and fit the function $Z(F)=Ax^2+Bx+C$ to a plurality of the lens positions $m_1, m_2, m_3, \ldots, m_{i-1}$ contained in the new dataset and a plurality of the focus values $f_1, f_2, f_3, \ldots, f_{i-1}, f_i$ individually corresponding to a plurality of the lens positions $m_1, m_2, m_3, \ldots, m_{i-1}, m_i$ and then the value i is increased by one, to re-estimate the estimated lens position $m_i$. Then, the process goes back to step S303.

Since the autofocus method performs focusing a model involving the lens position and the focus value, the ideal lens position may be obtained after only three lens movements.

Therefore, the method works by fitting the function $Z(F)=Ax^2+Bx+C$ to the focus samples in the dataset obtained through the previous steps until the ideal lens position is obtained. In theory, the value $|m_i-m_{i-1}|$ should be equal to zero; however, a sufficiently small value of $|m_i-m_{i-1}|$ is acceptable in practice.

Figure 4:
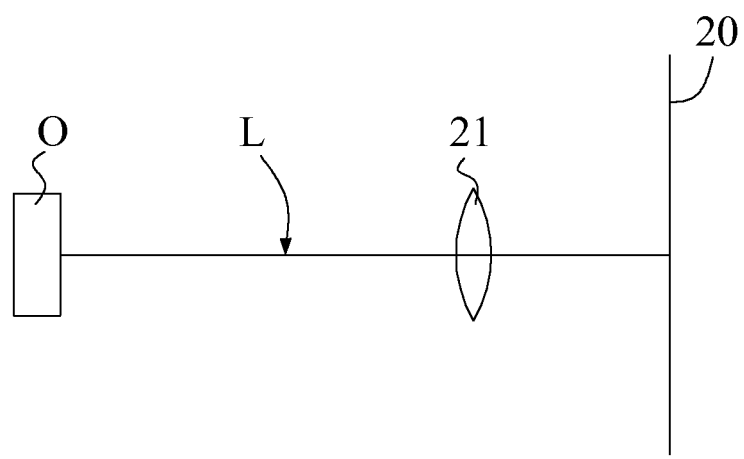
FIG. 4 is a diagram showing the axis of a lens perpendicular to the lens.

As shown in FIG. 4, the axis of the lens is perpendicular to the lens. In the case, the sensor plane 20 of the camera is not moved, and there are about 1100 lens positions along the axis L. The predetermined value M can be five. In other embodiments, the predetermined value M can be determined according to the number of lens positions, the application area or the required accuracy. Preferably, the predetermined value M is zero, i.e., the estimated lens position is the ideal lens position (meaning that the clearest image can be captured at this position).

Since there are three parameters A, B and C in the function $Z(F)=Ax^2+Bx+C$, the function can be fitted to three focus samples so as to estimate the parameters A, B and C. On the other hand, the full model $F=G(a,b,c,(x-m))$ has four parameters a, b, c and m, and, accordingly, the parameters a, b, c and m can be obtained by fitting the full model F to four focus samples.

According to the above-described steps, each time the lens is moved to an estimated lens position, the focus value is calculated and the function $Z(F)=Ax^2+Bx+C$ can further be fitted to the focus samples in the dataset, for estimating the subsequent lens position. Such a process is repeated until the estimated lens position is proximate to the current lens position, i.e., the difference between the estimated lens position and the current lens position is less than or equal to the predetermined value M.

Therefore, the autofocus method of the present invention does not need to move the lens to all lens positions to calculate the corresponding focus values. Instead, the present method only needs to fit the function to the focus samples in the dataset so as to estimate parameters of the function and the subsequent lens position.

Figure 5:
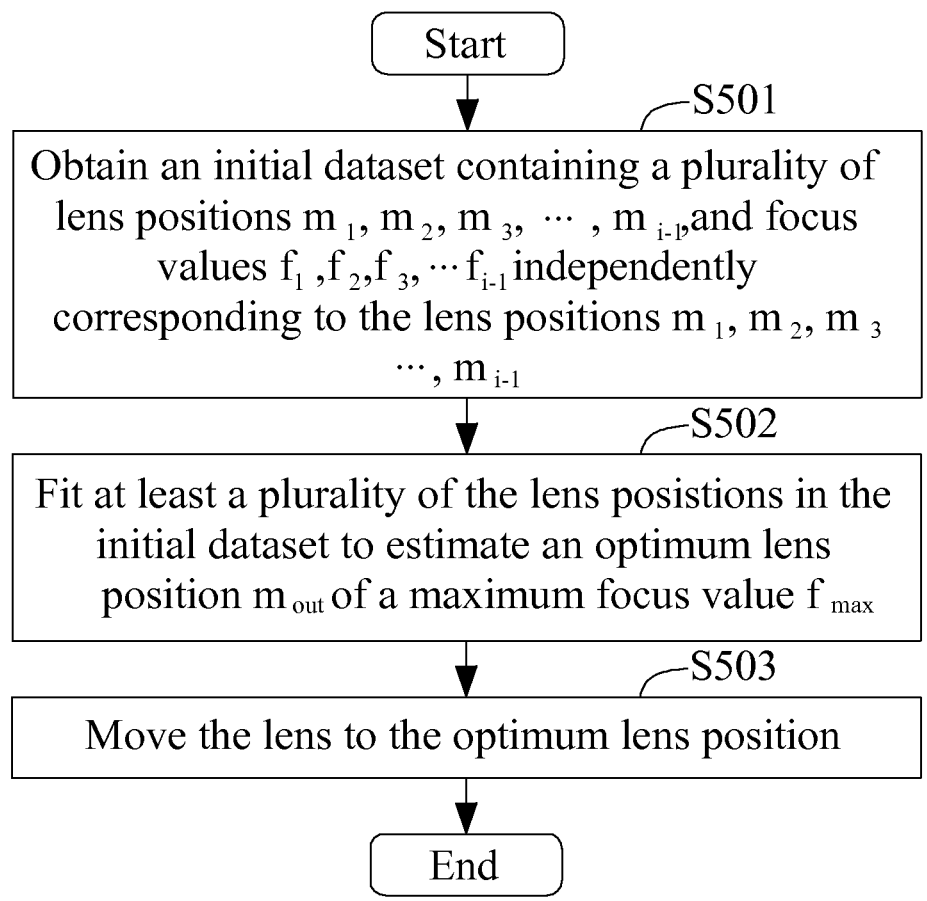
FIG. 5 is a flowchart showing an autofocus method according to an embodiment of the present invention.

FIG. 5 is a flowchart showing an autofocus method according to another embodiment of the present invention. As shown in FIG. 5, at step S501, an initial dataset of focus samples is obtained by moving the lens to different lens positions, wherein the initial dataset of focus samples contains a plurality of lens positions, $m_1, m_2, m_3, \ldots, m_{i-1}$ and focus values $f_1, f_2, f_3, \ldots, f_{i-1}$ independently corresponding to the lens positions $m_1, m_2, m_3, \ldots, m_{i-1}$. As a specific embodiment, the lens is moved to three different positions $m_1, m_2$, and $m_3$ so as to obtain the focus values $f_1, f_2$, and $f_3$ corresponding to the lens positions, respectively. The three different positions $m_1, m_2$, and $m_3$ and the corresponding focus values $f_1, f_2$, and $f_3$ are denoted as the initial dataset of focus samples. At step S502, fit a function $Z(F)=Ax^2+Bx+C$ to the focus samples in the initial dataset, to estimate an optimum lens position $m_{opt}$ with maximum focus value $f_{max}$. Preferably, the fitting is a weighted fitting in which weight values of the weight fitting are individually proportional to each of the focus values corresponding to the lens positions in the initial dataset. At step S503, move the lens to the optimum lens position $m_{opt}$. Then, the process of the autofocus method is terminated.

Figure 6:
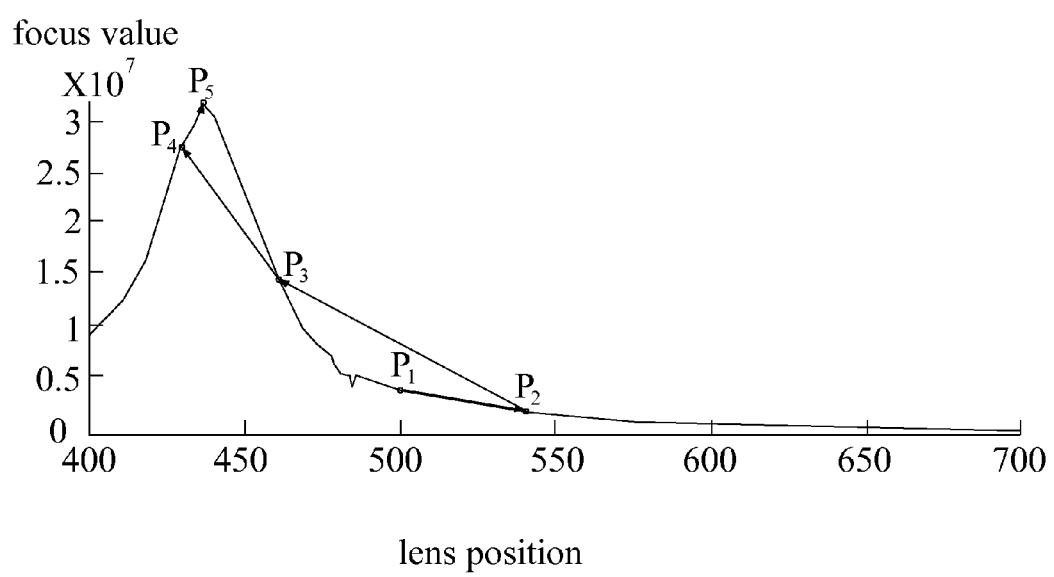
FIG. 6 is a diagram showing an autofocus process with the position of the lens gradually approaching the position with the maximum focus value.

FIG. 6 shows an autofocus process with the lens position gradually approaching the ideal lens position according to the embodiments shown in FIG. 3.

As shown in FIG. 6, first, a lens position $P_1$ is arbitrarily chosen and the focus value corresponding to the lens position $P_1$ is calculated. Next, another lens position $P_2$ is arbitrarily chosen and the corresponding focus value is calculated. Then, the focus values at these two lens positions $P_1, P_2$ are compared such that an estimated lens position $P_3$ is chosen with its focus value greater than the focus values at the lens positions $P_1, P_2$.

Then, fit the function $Z(F)=Ax^2+Bx+C$ to focus samples in the dataset comprising the three lens positions $P_1, P_2$, and $P_3$ and the corresponding focus values, so as to estimate the subsequent lens position $P_4$. Subsequently, move the lens to the position $P_4$ and the corresponding focus value is calculated. Thus, in total, there are four focus samples in the dataset comprising the four lens positions $P_1, P_2, P_3$ and $P_4$ and the corresponding focus values. Fit the function $Z(F)=Ax^2+Bx+C$ to the four focus samples so as to estimate another lens position $P_5$ in FIG. 6. Then, move the lens to the position $P_5$ and calculate the corresponding focus value.

Subsequently, determine whether the position $P_5$ is proximate to $P_4$, i.e., whether the difference between the lens position $P_4$ and the lens position $P_5$ is less than or equal to the predetermined value M. For example, if the difference between the lens position $P_5$ and the lens position $P_4$ is within 5 lens positions, it means that the lens position is proximate to the ideal lens position. Then, terminate the autofocus process. On the other hand, if the difference between the lens position $P_5$ and the lens position $P_4$ is greater than 5 lens positions, fit the function $Z(F)=Ax^2+Bx+C$ to the five focus samples obtained through the above-described steps so as to estimate another lens position and calculate the focus value corresponding to the lens position (such as $P_6$, not shown).

The fitting steps are repeated until the difference between the estimated lens position and the current lens position is less than or equal to the predetermined value, that is, the estimated lens position approximates the ideal lens position.

Therefore, according to the present invention, the ideal lens position can be estimated by fitting the function $Z(F)=Ax^2+Bx+C$ to an initial dataset of focus samples containing lens positions and corresponding focus values, and determining whether the estimated lens position is proximate to the prior-estimated lens position, wherein, if it is not, fit a plurality of the lens positions obtained in previous steps and the focus values individually corresponding to a plurality of the lens positions, the fitting process being repeated for estimating the subsequent lens position; and, if it is proximate, the autofocus process is terminated. Compared with the prior art, the present invention increases the focusing speed and reduces the number of lens movements. In addition, the parameters of the present invention control the amplitude and curvature of the curve formed by the lens positions and the focus values, such that the ideal lens position can be estimated through these parameters.

Therefore, the autofocus method of the present invention accumulates the focus samples obtained each time the lens is moved to a lens position so as to rectify the estimated lens position, thereby making the lens position proximate to the ideal lens position. As a result, the autofocus process can be rapidly and accurately completed.

The above-described descriptions of the detailed embodiments are provided to illustrate the preferred implementation according to the present invention, and are not intended to limit the scope of the present invention. Accordingly, many modifications and variations completed by those with ordinary skill in the art will fall within the scope of the present invention as defined by the appended claims.

Figure 7:
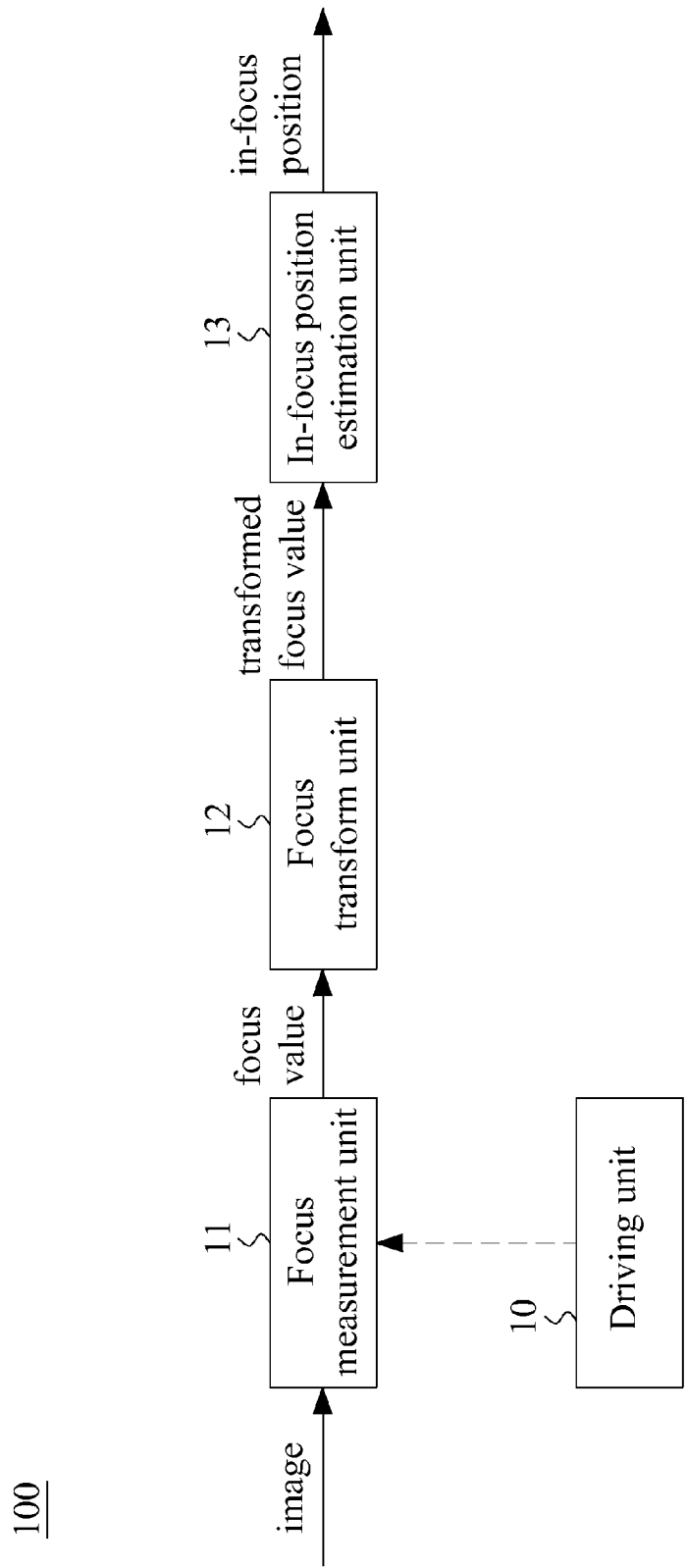
FIG. 7 shows a block diagram illustrating an autofocus system according to one embodiment of the present invention.

FIG. 7 shows a block diagram illustrating an autofocus system 100 according to one embodiment of the present invention. The autofocus system 100 may generally be adapted to an image capture device such as a still camera or a video camera. In the embodiment, a focus measurement unit 11 receives an image, and accordingly generates an associated focus value. The higher the focus value is, the sharper the image is; on the contrary, the lower the focus value is, the more blurred the image is. The focus measurement unit 11 of the embodiment may be implemented by a standard focus measurement technique such as a high-pass filter. As a sharp image has more high-frequency components than a blurred image, a higher focus value may be obtained after subjecting the sharp image to the high-pass filter, and a lower focus value may be obtained after subjecting the blurred image to the high-pass filter. The focus measurement unit 11 may be implemented in a hardware or a software manner. The focus value may be directly obtained by performing computations on the image, or may be indirectly obtained by performing computations on frequency components of the image.

The operation of the focus measurement unit 11 may be accompanied by a driving unit 10, such as a servo motor. The driving unit 10 may be utilized to move a lens of the image capture device to a lens position and then capture an image, based on which the focus measurement unit 11 may accordingly generate an associated focus value. A focus profile, as exemplified in FIG. 8, may thus be obtained by collecting lens positions and their associated focus values. With respect to the focus profile, a sharpest image normally corresponds to the maximum focus value associated with an in-focus position. On the contrary, a blurred image normally corresponds to a lower focus value associated with an out-of-focus region. It is worthy of noting that, as the flat out-of-focus region, as exemplified in FIG. 8, occupies a greater portion of the focus profile than the steep in-focus region, there is insufficient information adequate to fast and accurately estimate the in-focus position.

Accordingly, a focus transform unit 12 is used in the embodiment to receive the focus value provided by the focus measurement unit 11, and then transform the provided focus value, therefore generating an associated transformed focus value. Subsequently, an in-focus position estimation unit 13 obtains an in-focus position, in an analytical manner, according to some transformed focus values and their associated lens positions. The focus transform unit 12 and the in-focus position estimation unit 13 of the embodiment may be implemented in a hardware or a software manner.

Figure 8:
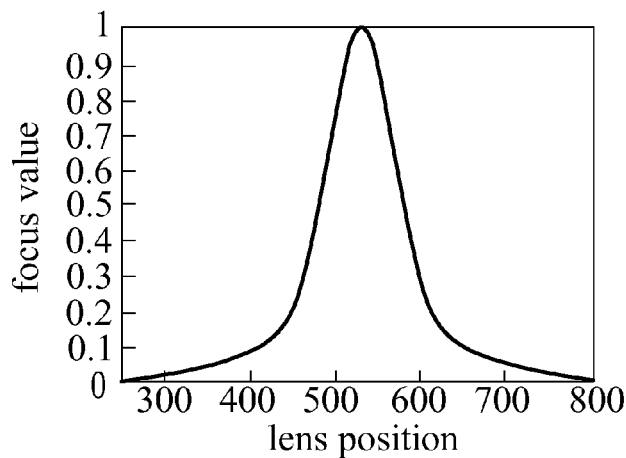
FIG. 8 shows an exemplary focus profile.
Figure 9:
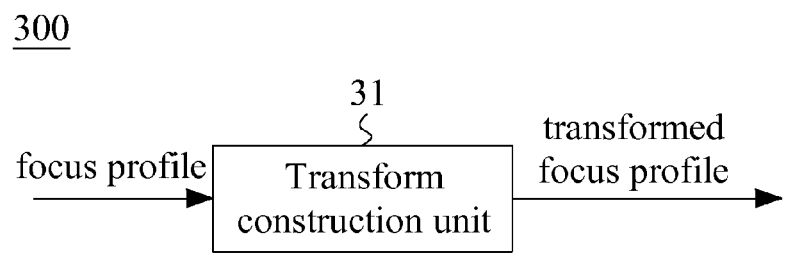
FIG. 9 shows a block diagram illustrating a focus transform construction system according to the embodiment of the present invention.

FIG. 9 shows a block diagram illustrating a focus transform construction system 300 according to the embodiment of the present invention. Based on the focus transform construction system 300, the focus transform unit 12 (FIG. 7) may hence operate. In the embodiment, the focus transform construction system 300 primarily includes a transform construction unit 31, which receives a focus profile, as exemplified in FIG. 8, provided by the focus measurement unit 11, and then transforms the provided focus profile to a transformed focus profile. According to one aspect of the embodiment, the transformed focus profile may be described by an analytical mathematical expression. In this specification, the "analytical mathematical expression" refers to a mathematical expression constructed using basic arithmetic operations, such as addition, subtraction, multiplication, division or exponentiation, that lend the mathematical expression readily to calculation. The analytical mathematical expression may, but not necessarily, be a closed-form mathematical expression or an algebraic mathematical expression. The transformed focus profile generated by the transform construction unit 31 is then provided to the focus transform unit 12 (FIG. 7), based on which the focus value is transformed.

The aspect of the transformed focus profile being describable by an analytical mathematical expression may be implemented by programming or by a numerical table that keeps a record of focus values (before transformation) and associated transformed focus values. The numerical table may be stored in a memory device, such as a non-volatile memory device, of the image capture device.

Figure 10:
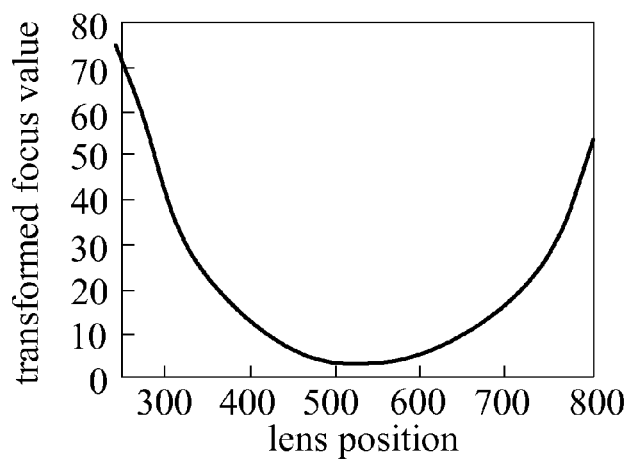
FIG. 10 shows an exemplary transformed focus profile generated by the transform construction unit of FIG. 9.

FIG. 10 shows an exemplary transformed focus profile generated by the transform construction unit 31 (FIG. 9). According to another aspect of the embodiment, the transformed focus profile (FIG. 10) expands the steep region and compresses the flat region of the original focus profile (FIG. 8). Accordingly, there is increased information adequate to fast and accurately estimate the in-focus position. Therefore, the in-focus position estimation unit 13 (FIG. 7) may fast and accurately estimate the in-focus position in an analytical manner, thereby substantially reducing the amount of computations required to estimate the in-focus position. Taking the transformed focus profile of FIG. 10 as an example, the in-focus position estimation unit 13 may obtain, in an analytical mathematical manner, the minimum value that corresponds to the in-focus position.

As the present embodiment is capable of fast estimating the in-focus position, the driving unit 10 may accordingly fast move the lens to the estimated in-focus position. Furthermore, as the embodiment utilizes analytical mathematics to obtain the in-focus position, the computations become simplified, and the amount of computations and empirical parameters may be substantially reduced. Moreover, the focus transformation of the embodiment may be determined in advance before the image capture device leaves the factory; and once the focus transformation has been determined, it may be applied to different scenes. As no assumption about focus measurement need be made, the embodiment may be adapted to transform focus values generated by a variety of focus measurement techniques. Compared to the conventional autofocus methods that directly use the focus values generated by the focus measurements in estimating the in-focus position, the present embodiment, however, first transforms the focus value and then estimates the in-focus position according to the transformed focus value. The transformed focus profile of the embodiment may be described by an analytical mathematical expression such that the in-focus position can be accurately estimated even the lens is in an out-of-focus position, therefore making it feasible to fast accomplish autofocus.

Although specific embodiments have been illustrated and described, it will be appreciated by those skilled in the art that various modifications may be made without departing from the scope of the present invention, which is intended to be limited solely by the appended claims.

What is claimed is:

1. An autofocus system, comprising:
   a focus measurement unit configured to receive an image and accordingly generate an associated focus value;
   a focus transform unit configured to receive the focus value provided by the focus measurement unit and then transform the focus value, thereby generating an associated transformed focus value; and
   an in-focus position estimation unit configured to obtain an in-focus position, in an analytical manner, according to a plurality of the transformed focus values and a plurality of associated lens positions.

2. The system of claim 1, further comprising:
   a transform construction unit configured to receive a focus profile provided by the focus measurement unit, and transform the focus profile to generate a transformed focus profile, which is then provided to the focus transform unit to perform transformation on the focus value.

3. The system of claim 2, wherein the transformed focus profile is described by an analytical mathematical expression.

4. The system of claim 2, wherein the transformed focus profile is expressed by a numerical table that keeps a record of the focus values and the associated transformed focus values.

5. The system of claim 4, wherein, the numerical table is stored in a memory device of an image capture device.

6. The system of claim 1, further comprising:
   a driving unit configured to move a lens to a lens position to capture an associated image, according to which the focus measurement unit generates the associated focus value.

7. The system of claim 1 is adapted to a still camera.

8. The system of claim 1 is adapted to a video camera.

9. The system of claim 1, wherein, the focus measurement unit comprises a high-pass filter.

10. An autofocus method, comprising:
    receiving an image and accordingly generating an associated focus value;
    receiving the focus value and then transforming the focus value, thereby generating an associated transformed focus value; and
    obtaining an in-focus position, in an analytical manner, according to a plurality of the transformed focus values and a plurality of associated lens positions.

11. The method of claim 10, further comprising:
    receiving a focus profile by collecting the focus values and the associated lens positions, and transforming the focus profile to generate a transformed focus profile, which is then used to perform transformation on the focus value.

12. The method of claim 11, wherein the transformed focus profile is described by an analytical mathematical expression.

13. The method of claim 11, wherein the transformed focus profile is expressed by a numerical table that keeps a record of the focus values and the associated transformed focus values.

14. The method of claim 13, wherein the numerical table is stored in a memory device of an image capture device.

15. The method of claim 10, further comprising:
    driving to move a lens to a lens position to capture an associated image, according to which the associated focus value is generated.

16. The method of claim 10 is adapted to a still camera.

17. The method of claim 10 is adapted to a video camera.

18. The method of claim 10, wherein the step of generating the focus value is performed by high-pass filtering.

* * * * *